US006978335B2

(12) United States Patent
Lee

(10) Patent No.: US 6,978,335 B2
(45) Date of Patent: Dec. 20, 2005

(54) SMART CARD VIRTUAL HUB

(75) Inventor: Patrick S. Lee, Milpitas, CA (US)

(73) Assignee: 02Micro International Limited, Grand Cayman (KY)

( * ) Notice: Subject to any disclaimer, the term of this patent is extended or adjusted under 35 U.S.C. 154(b) by 411 days.

(21) Appl. No.: 09/878,007

(22) Filed: Jun. 8, 2001

(65) Prior Publication Data

US 2002/0011516 A1 Jan. 31, 2002

Related U.S. Application Data

(60) Provisional application No. 60/215,297, filed on Jun. 30, 2000.

(51) Int. Cl.[7] .............................................. G06F 13/14
(52) U.S. Cl. ..................... 710/305; 710/306; 710/313; 713/600; 725/6
(58) Field of Search ........................ 710/313, 301–304, 710/100, 104, 305–306; 713/310, 600; 725/6

(56) References Cited

U.S. PATENT DOCUMENTS

| | | | |
|---|---|---|---|
| 3,754,148 A | 8/1973 | Nye ............................. | 307/10 |
| 4,090,089 A | 5/1978 | Morello et al. ............... | 307/40 |
| 4,553,127 A | 11/1985 | Issa ............................. | 340/64 |
| 4,553,511 A | 11/1985 | Hayakawa et al. .......... | 123/179 |
| 5,008,846 A | 4/1991 | Inoue .......................... | 364/707 |
| 5,019,996 A | 5/1991 | Lee ............................. | 364/483 |
| 5,023,591 A | 6/1991 | Edwards ..................... | 340/426 |
| 5,176,523 A | 1/1993 | Lai .............................. | 439/64 |
| 5,191,228 A | 3/1993 | Sloan ......................... | 307/10.3 |
| 5,396,635 A | 3/1995 | Fung ........................... | 395/800 |
| 5,498,486 A | 3/1996 | Gatehouse ................... | 429/7 |
| 5,555,510 A | 9/1996 | Verseput et al. ............ | 364/514 |
| 5,630,090 A | 5/1997 | Keehan et al. .............. | 395/433 |
| 5,671,368 A | 9/1997 | Chan et al. ................. | 395/282 |
| 5,675,813 A * | 10/1997 | Holmdahl .................... | 713/310 |
| 5,716,221 A | 2/1998 | Kantner ....................... | 439/64 |
| 5,763,862 A | 6/1998 | Jachimowicz et al. ...... | 235/380 |
| 5,809,312 A | 9/1998 | Ansel et al. ........... | 395/750.01 |
| 5,878,264 A | 3/1999 | Ebrahim ................. | 395/750.05 |
| 5,936,226 A | 8/1999 | Aucsmith .................... | 235/492 |
| 5,963,464 A | 10/1999 | Dell et al. .................... | 365/52 |
| 5,964,597 A | 10/1999 | Hirata et al. ................ | 439/108 |
| 5,975,959 A | 11/1999 | Joly ........................... | 439/630 |

(Continued)

FOREIGN PATENT DOCUMENTS

WO    WO 9946669 A    9/1999

OTHER PUBLICATIONS

Operating System Enhancements, Chapter 5, Windows XP Professional Security.*

Primary Examiner—Rehana Perveen
Assistant Examiner—Kim T. Huynh
(74) Attorney, Agent, or Firm—Grossman, Tucker, Perreault & Pfleger, PLLC

(57) ABSTRACT

A smart card virtual hub combines a ISO7816 compliant smart card reader interface with a USB hub that provides one or more attachment points for connection of devices to the USB bus, thereby interfacing such devices to the host computer. The hub in the presently preferred embodiment of the invention provides one port to which one USB functional device, such as a keyboard, may be attached. The attached keyboard shares a common USB bus bandwidth with the internal embedded smart card reader through a host-scheduled, token-based communication protocol that is handled by the USB driver and the device driver.

16 Claims, 4 Drawing Sheets

U.S. PATENT DOCUMENTS

| | | | |
|---|---|---|---|
| 5,986,891 A | 11/1999 | Sugimoto | 361/737 |
| 6,015,092 A | 1/2000 | Postlewaite et al. | 235/486 |
| 6,085,327 A | 7/2000 | Seng et al. | 713/300 |
| 6,363,491 B1 * | 3/2002 | Endo | 713/310 |
| 6,564,056 B1 * | 5/2003 | Fitzgerald | 340/5.1 |
| 6,581,122 B1 * | 6/2003 | Sarat | 710/301 |
| 6,601,109 B1 * | 7/2003 | Bealkowski et al. | 709/250 |
| 6,708,247 B1 * | 3/2004 | Barret et al. | 710/313 |
| 2003/0135681 A1 * | 7/2003 | Laily et al. | 710/303 |
| 2003/0177294 A1 * | 9/2003 | Russell | 710/62 |

* cited by examiner

SMART CARD VIRTUAL HUB

This application claims the benefit of Provisional Application No. 60/215,297, filed Jun. 30, 2000.

BACKGROUND OF THE INVENTION

1. Technical Field

The invention relates to smart cards. More particularly, the invention relates to a smart card reader which incorporates a hub, wherein the smart card reader is easily integrated into such devices as, for example, a keyboard, desktop computer, or an Internet appliance.

2. Description of the Prior Art

Smart cards are typically the same size as a conventional credit card. They are referred to as smart cards because they contain an embedded microchip. Smart cards are capable of storing personalized electronic data that can be used to authenticate a user to the user's computer, and to authenticate the user during related e-commerce transactions. This technology, which requires both smart card reader hardware and software components for data transactions, effectively increases security and enables authorized users to have access to sensitive data and/or to enter into binding transactions. Because of the increased network security they provide, smart cards are often used for trusted e-commerce and digital transaction security.

Today smart cards are used in virtually every aspect of the high technology industry—from commerce applications to identification, from benefits management to Internet/e-commerce transactions, and from telecommunications to broadcast television downloads. The increase in use of computer networks and the emergence of the Internet as a mechanism for both e-commerce and e-communication has accelerated the growth of demand, and the applications available, for smart cards.

Because a smart card can store information to protect privacy and data security, while strictly and precisely limiting access to such data, smart cards are becoming a favorable choice for computer and Internet access. In this type of application, the smart card becomes a secure extension of a computer network. As a result, computer manufacturers increasingly include smart card readers in the computer products that they offer to their customers. In this way, such products are able to meet today's on going e-business security challenge in Internet access, network access, and electronic transactions.

Previous smart card reader solutions have some or all of the following shortcomings:

They typically require two different interface cables and connectors, e.g. PS/2 and RS232, to connect the smart card reader to the computer.

It may be necessary to add an expansion interface card inside the computer to support the added smart card reader function due to a lack of RS232 connector availability on the computer motherboard.

More components are required to build a typical smart card reader solution.

A typical smart card reader solution makes a computer more expensive to build.

A smart card reader solution may require two separate devices/boxes to handle both the keyboard and the smart card reader functions.

Current solutions are bulky in design because they typically require two cables and two device boxes.

Known smart card reader solutions are not Plug and Play because they are based upon such old technology as RS232 and PS/2.

Known smart card reader solutions are not hot-pluggable. Rather, the use of such solutions typically requires that the user shut down the computer, e.g. for the replacement of a malfunctioning smart card reader or keyboard, and then restart the computer to load a software driver which is needed to enable the smart card reader function.

The user may need to remove the computer cover to replace a malfunctioning internal expansion interface card.

What is needed is a smart card reader solution that provides the advantages of smart card reader technology without the current limitations and shortcomings of such technology.

SUMMARY OF THE INVENTION

The invention provides a smart card reader solution that provides the advantages of smart card reader technology without the current limitations and shortcomings of such technology. The cost saving of the herein disclosed smart card reader solution, which is based on a novel smart card virtual hub, allows computer manufacturers to provide smart card reader solutions, such as smart card keyboards, to their customers as standard computer features.

To overcome the shortcomings of prior smart card reader solutions that are currently available in the market, the invention specifically addresses at least the following issues:

Prior art solutions occupied two computer interfaces, e.g. PS/2 and RS232, frequently leading to the costly decision of adding an expansion card to create an attachment point for the smart card reader.

Prior art solutions required two dedicated cables to connect the smart card reader to the computer.

Prior art solutions were non hot-pluggable. Rather, the user was required to restart the computer to which the smart card reader was attached to load the software needed to operate the smart card reader, e.g. when the smart card reader is removed and re-attached again.

Prior art solutions have a high manufacture cost, which is currently about $30.00 US each.

The presently preferred embodiment of the herein disclosed invention offers a smart card keyboard that is Plug N Play, and that is also hot pluggable. This aspect of the invention makes it possible to replace and change a malfunctioning smart card keyboard without shutting off the computer's power. This is important for e-commerce and Internet applications that require no down time, e.g. 24×7 availability, such as those applications which support e-commerce transactions.

The smart card virtual hub chip herein disclosed includes a smart card reader interface that allows a smart card reader to be integrated with a keyboard, without the need for glue logic and additional component requirements. The end product, e.g. a smart card keyboard, is Plug N Play. This allows for automatic configuration and for immediate use upon connecting the smart card keyboard to the computer; and provides a device that is hot-pluggable, which allows for replacement or change of a malfunctioning smart card keyboard without the need to shut off the computer. The end product, e.g. smart card keyboard, also carry a typical manufacture cost that is lower than about $15.00 US each.

The invention is based in part upon the recognition by the inventors that computers are now equipped with USB connectors, and that customers demand that new peripherals come equipped with a USB interface, rather than an RS232 interface.

The invention simplifies the interface between the smart card keyboard and the computer by allowing interconnection with just one cable via a single communication interface. Using an architecture referred to as USB, the smart card virtual hub attaches both a keyboard and a smart card reader function, via a USB bus, to the host computer.

The combination of a USB bus interface and the virtual hub architecture offers at least the following advantages:

- A four-wire USB cable and a USB connector are used to couple the smart card keyboard to the host computer instead of the two cables, i.e. one nine-pin RS232 cable and connector and one six-pin PS/2 cable and connector, required by the prior art.
- The invention provides ease of integration of the smart card reader function to an industry standard USB keyboard with the support of the MS Windows operating system, while requiring minimum engineering and software development effort.
- The invention supports Plug N Play and allows devices to be hot pluggable for ease of configuration and installation.
- The invention features a low component count and has a low cost to manufacture.

USB Bus

USB is a cable bus that supports data exchange between a host computer and a wide range of simultaneously accessible peripherals. Multiple peripherals can be shared over the same USB bus using a single cable and connector.

The USB bus supports Plug N Play configuration and hot pluggable detection. A new device is detected by the host computer once it is attached to the bus and automatically installs the required software driver, which is typically included in the Windows 98/2000/ME operating systems, to access the device.

By employing a USB bus, the smart card keyboard requires only one four-wire USB cable to connect the smart card keyboard to the host computer's USB connector.

USB Smart Card Virtual Hub Architecture

The smart card virtual hub combines ISO7816 compliant smart card reader interface with a USB hub that could provide up to three attachment points for connection of devices to the USB bus, thereby interfacing such devices to the host computer. The hub in the presently preferred embodiment of the invention provides one port to which one USB functional device, such as a keyboard, may be attached. The attached keyboard shares a common USB bus bandwidth with the internal embedded smart card reader interface through a host-scheduled, token-based communication protocol that is handled by the USB driver and the device driver.

DETAILED DESCRIPTION OF THE INVENTION

Figure 1:
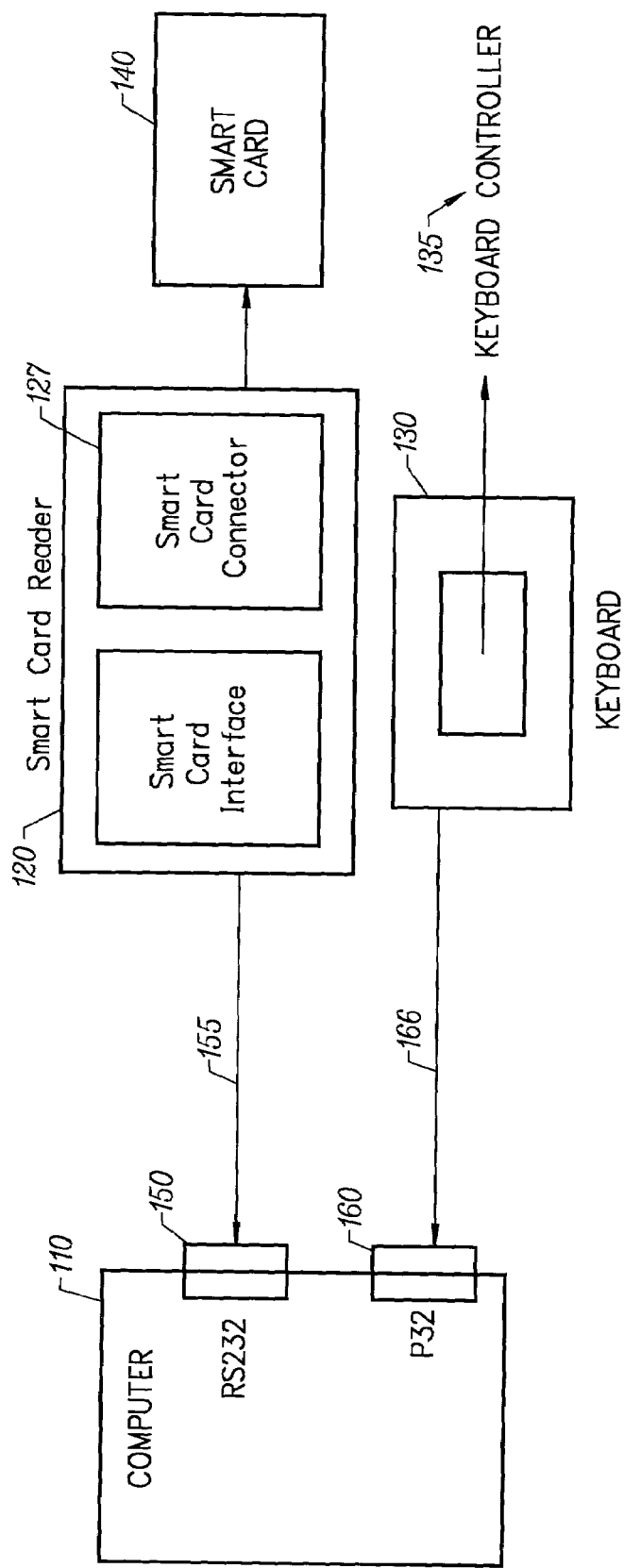
FIG. 1 is a block diagram which shows a conventional solution for adding a smart card reader to a keyboard.

The invention comprises a smart card virtual hub which offers a smart card reader capability and provides one or more attachment points for connection of devices to a USB bus, thereby interfacing such devices to a host computer. The hub in the presently preferred embodiment of the invention, which is internally embedded with a smart card reader interface, provides one port to which one USB functional devices, such as a keyboard, may be attached. It will be appreciated by those skilled in the art that any number of devices may be attached by providing additional ports, as is supported by the USB specification. Further, while the invention herein is described in terms of the USB bus, it will be appreciated by those skilled in the art that the invention is readily applicable to similar bus standards as are known or are likely to be developed. Additionally, while the invention is described herein in terms of a smart card reader/ keyboard form factor, it will be appreciated by those skilled in the art that the invention is readily applicable to any desired form factor and that the invention herein is not limited to the exemplary form factor described.

The Universal Serial Bus (see Universal Serial Bus Specification 1.1, Copyright © 1998, Compaq Computer Corporation, Intel Corporation, Microsoft Corporation, NEC Corporation, available at http://www.usb.org) was originally developed in 1995. The major goal of USB was to define an external expansion bus which makes adding peripherals to a computer as easy as hooking up a telephone to a wall-jack. The program's driving goals were ease-of-use and low cost. These were enabled with an external expansion architecture which highlights:

computer host controller hardware and software,
robust connectors and cable assemblies,
peripheral friendly master-slave protocols, and
expandable through multi-port hubs.

Role of Host Computer Hardware and Software

The role of the system software is to provide a uniform view of the IO system for all application software. It hides hardware implementation details so that application software is more portable. For the USB IO subsystem in particular, it manages the dynamic attach and detach of peripherals. This phase, called enumeration, involves communicating with the peripheral to discover the identity of a device driver that it should load, if not already loaded. A unique address is assigned to each peripheral during enumeration to be used for run-time data transfers. During run-time the host computer initiates transactions to specific peripherals, and each peripheral accepts it's transactions and responds accordingly. Additionally, the host computer software incorporates the peripheral into the system power management scheme and can manage overall system power without user interaction.

Role of the Hub

Besides the role of providing additional connectivity for USB peripherals, a hub provides managed power to attached peripherals. It recognizes dynamic attachment of a peripheral and provides a maximum of 100 mA of current to the peripheral during configuration. After the peripheral is configured, the bus powered hub can provide up to a maximum of 100 mA and the self powered hub can provide up to maximum of 500 mA, for peripheral operation. A bus powered hub received its power from the upstream cable, while a self-powered hub has its own power supply. A newly attached hub is assigned its unique address, and hubs may be cascaded up to five levels deep. During run-time a hub operates as a bidirectional repeater and repeats USB signals as required on upstream (towards the host) and downstream (towards the device) cables. The hub also monitors these signals and handles transactions addressed to itself. All other transactions are repeated to attached devices. A hub supports both 12 Mb/s (full-speed) and 1.5 Mbs (low-speed) peripherals.

Role of the Peripheral

All USB peripherals are slaves that obey a defined protocol. They must react to request transactions sent from the host computer. The peripheral responds to control transactions that, for example, request detailed information about the device and it's configuration. The peripheral sends and receives data to/from the host using a standard USB data format. This standardized data movement to/from the computer host and interpretation by the peripheral gives USB it's enormous flexibility with little computer host software changes. USB 1.1 peripherals can operate at 12 Mb/s or 1.5 Mb/s, while USB 2.0 (proposed) operates at faster speeds.

The Invention

In the preferred embodiment of the invention, the attached (both embedded, built in, and external) peripherals share a common USB bus bandwidth through a host-scheduled, token-based communication protocol that is handled by the USB driver and the device driver.

FIG. 1 is a block diagram which shows a conventional solution for adding a smart card reader to a keyboard.

A keyboard 130 is connected to a PS/2 connector 160 of a computer 110 through a PS/2 cable 166. The PS/2 cable 166 is a six-wire cable, including 5V, ground, data, and clock lines. The power supply required by the keyboard 130 is provided by the computer 110 via the PS/2 cable 166. A keyboard controller 135 resides inside the keyboard 130 and is used for encoding the keystroke inputs and for transmitting these inputs to the computer 110.

A smart card reader 120 is connected to the computer through an RS-232 serial cable 155 via a serial port connector 150 of the computer 110. The RS-232 cable 155 is a nine-wire cable that includes DTR, DCD, CTS, GND, data transmit, and data receive lines. The power supply is provided to the smart card reader 120 from the computer 110 through the RS-232 cable 155. Inside the smart card reader 120, there is a minimum of three components that include an RS-232 interface chip, a microcontroller that contains smart card firmware, and a smart card interface chip for handling the data exchange between the computer and the smart card 140.

The conventional smart card keyboard solution is expensive. It employs two different kinds of communication interfaces, i.e. RS232 and PS/2, and two cables to communicate with the computer. It also consumes more desk space because it comprises two pieces of equipment, i.e. the keyboard and the smart card reader.

Figure 2:
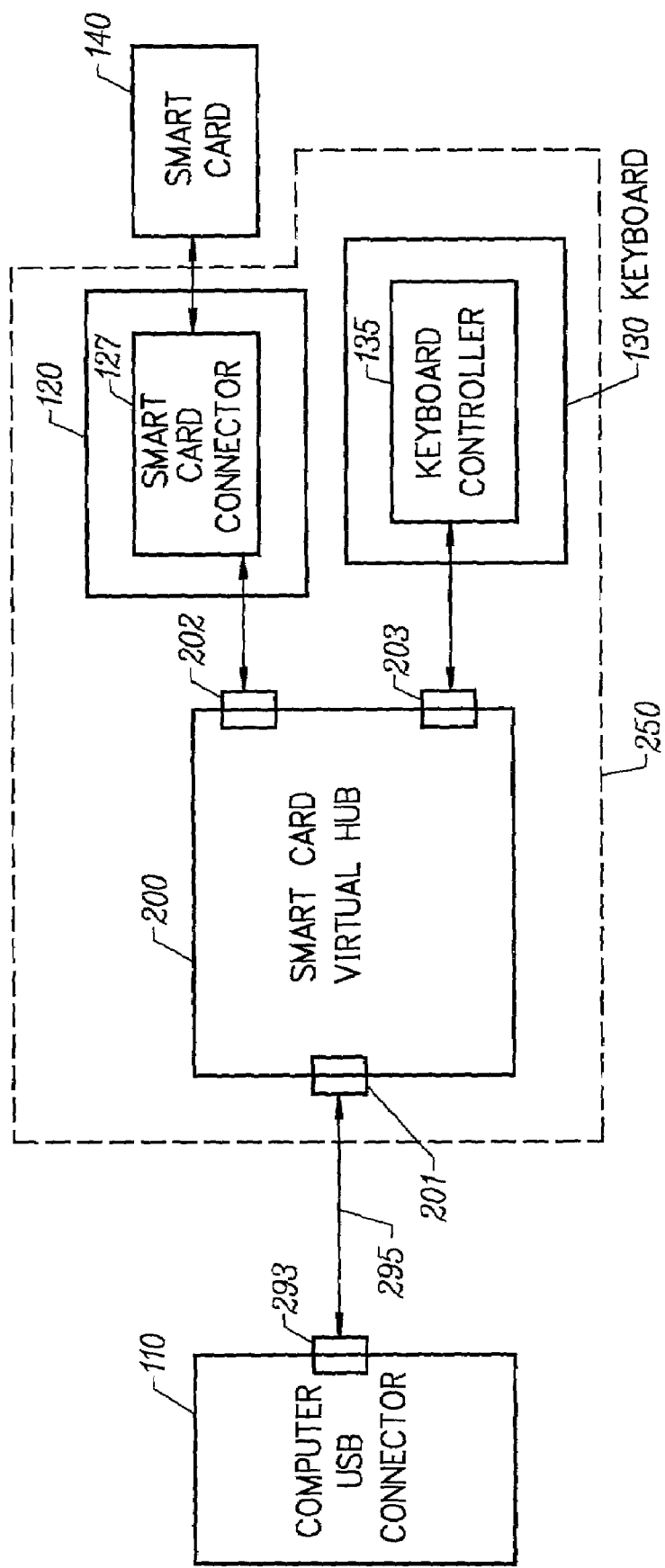
FIG. 2 is a block diagram which shows integration of a keyboard controller to a smart card virtual hub chip to provide a smart card keyboard according to the invention.

FIG. 2 is a block diagram which shows integration of a keyboard controller to a smart card virtual hub circuit to provide a smart card keyboard according to the invention. FIG. 2 shows a USB keyboard controller 135 connected to a smart card virtual hub 200 via USB data port 203 for communication with the computer 110. The preferred smart card virtual hub 200 has one upstream USB data port 201, one downstream smart card interface 202, and one downstream USB data port 203.

The upstream USB data port 201 connects to a USB Series A receptacle 293 of the computer 110 with a four-wire USB cable 295. The four-wire cable comprises a D+ differential signal, a D− differential signal, a ground signal, and a 5V power supply, and has a Series A plug at one end. The smart card virtual hub 200 receives control information, commands, and data from the computer 110. Data are also sent from the smart card virtual hub 200 to the computer 110 when requested.

The smart card reader interface function is built into the virtual hub. These interface signals connects to the contact pins of the external smart card connector 127 via the smart card interface port 202, which resides inside the smart card reader 120.

The interface provides the signals that are required to control and exchange information with a smart card 140 when the smart card is inserted into the external smart card connector 127. The signal pins of the smart card 140 mechanically contact the contact pins of the external smart card connector 220. The card exchanges information with the computer 110 in response to signals provided by the smart card virtual hub 200.

The downstream USB data port 203 connects to an external USB keyboard controller 135, which resides in the keyboard 130. The keystrokes entered on the keyboard 130 are encoded by the USB keyboard controller 135 and transmitted to the smart card virtual hub 200 in a USB protocol data packet, and are then delivered to the computer 110 under the control of the keyboard device driver and the USB driver, both of which reside in the computer 110 in the preferred embodiment. A dashed line 250 indicates a smart card keyboard enclosure in one possible form factor in which the keyboard and smart card reader are combined.

Figure 3:
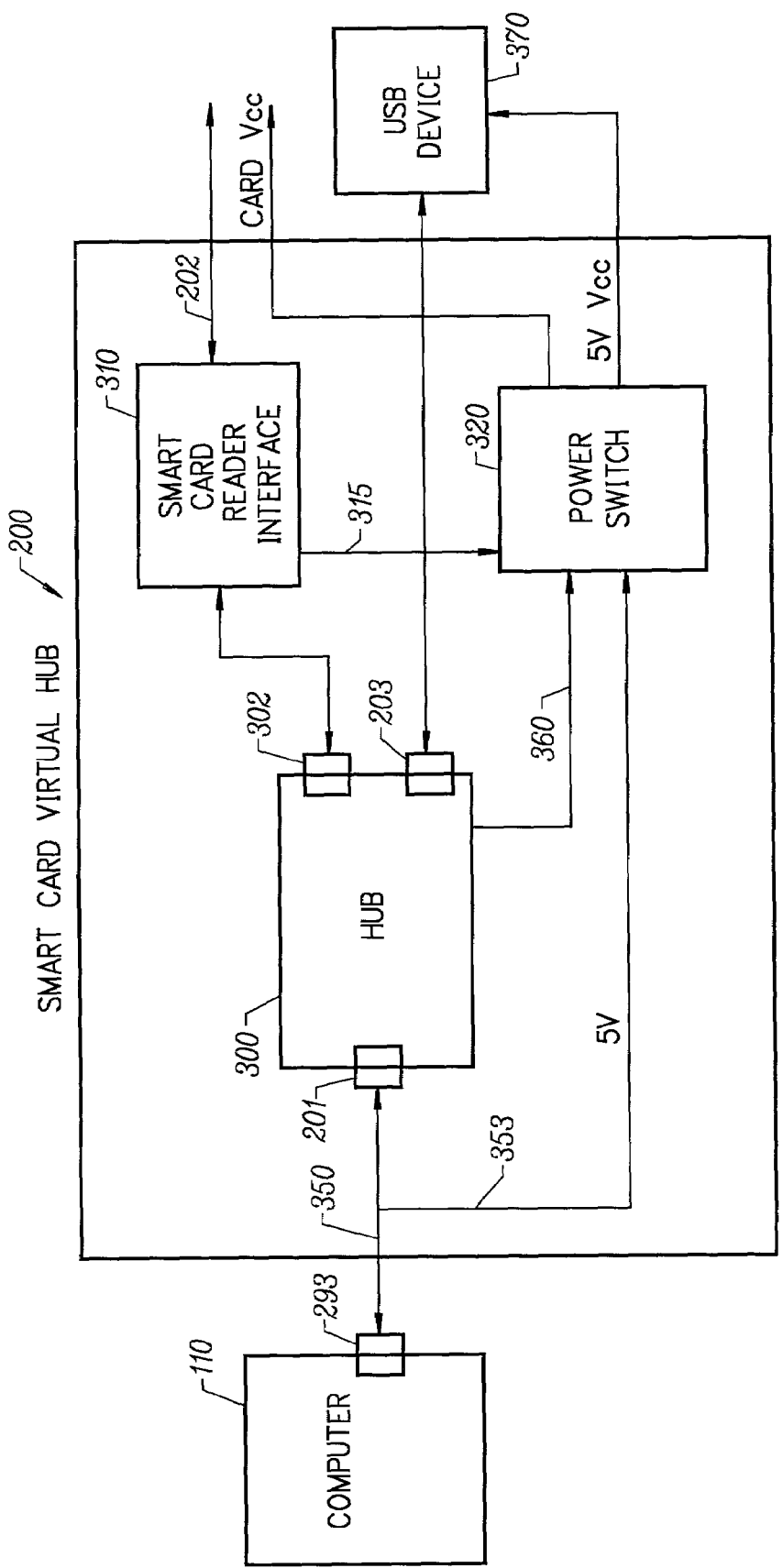
FIG. 3 is a block diagram which shows the architecture of the smart card virtual hub.

FIG. 3 is a block diagram which shows the architecture of the smart card virtual hub 200. A smart card virtual hub 200 is a conventional USB hub 300 with a smart card reader interface built-in. This is constructed by permanently connecting a smart card reader interface to the conventional USB hub's downstream port 302 internally. The other downstream port 203 of the conventional hub 300 is used as an attachment point to connect other external USB peripherals to the computer 110 via the upstream data port 201.

The smart card virtual hub 200 architecture accomplishes two objectives:

It creates a USB function interface that also has a ISO/IEC-7816 compliant smart card interface. This arrangement easily collocates the smart card reader with other USB devices.

It reduce the manufacturing cost for integrating a smart card reader to a keyboard or other USB device because up to three major supporting components are embedded into the smart card virtual hub. This configuration would otherwise require the addition of external devices on the computer printed circuit board (PCB).

As shown on FIG. 3, the smart card reader interface 310 is connected to the USB hub 300 at a data downstream port 302 to receive control and data transfer from the computer 110, as well as for transmitting data from the external smart card to the computer 110. The smart card reader interface 310 provides bidirectional data transfers between the external smart card and the computer 110. The invention also comprises a card interface logic that generates interface signals to support the operation of any type of smart card that is compliant with the ISO 3716 standard. The interface signals that the card interface logic generates includes Reset, Card Power Enable, and Card Clock signals.

The five-volt power supply from the computer's (110) USB connector 293 is connected to the power switch 320, through the power wire 353 of the USB cable 350. A power enable signal 360 from the hub 300 turns on the power switch 320 to provide five-volt power to the device 370 that connects to the downstream port 203. The power enable signal 360 is asserted once the hub 300 detects that a device is connected to the downstream port 203.

The power switch also provides a VCC voltage supply of three volts or five volts to the contacts of the smart card in response to a control signal 315 from the smart card reader 310.

Figure 4:
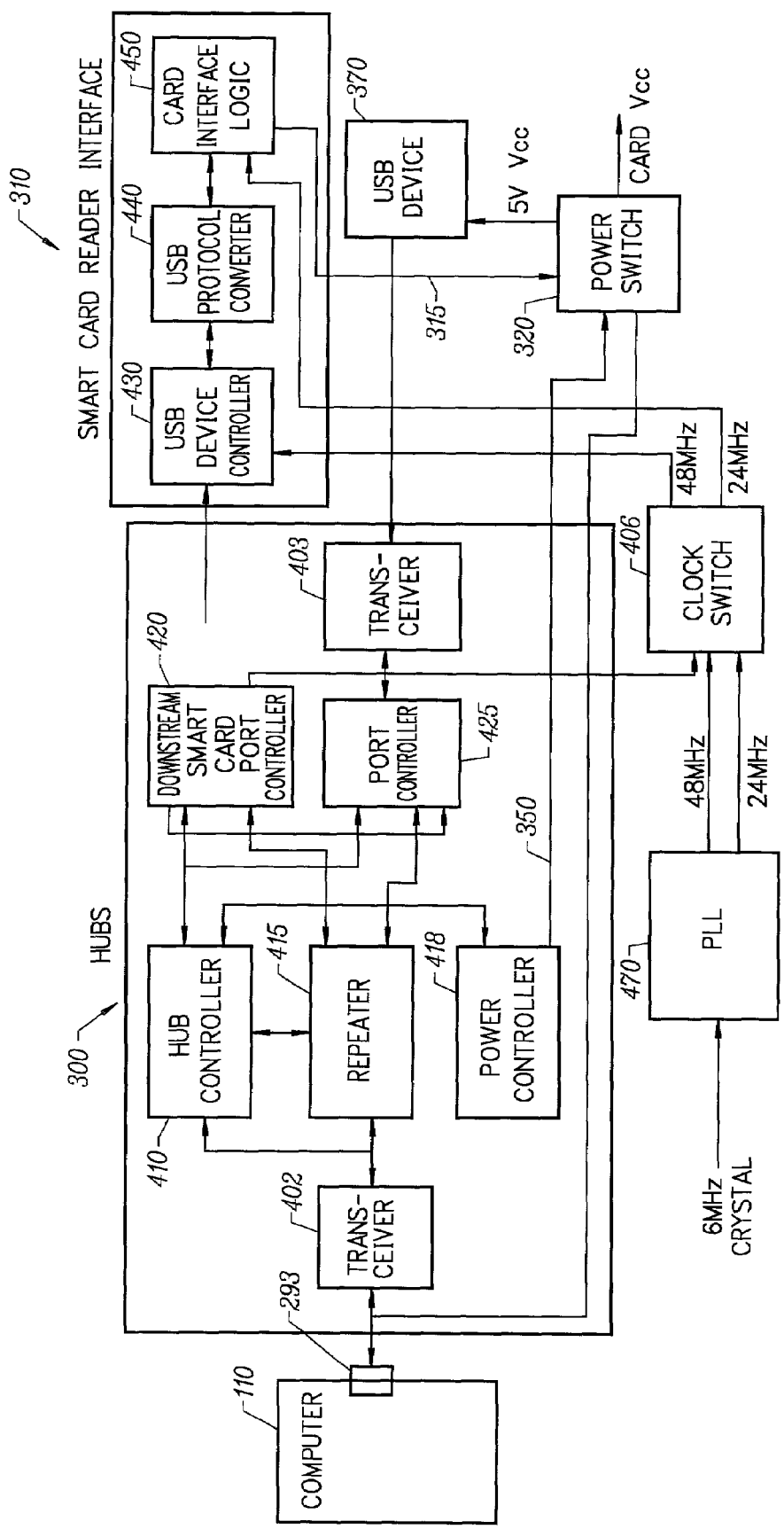
FIG. 4 is a detailed block diagram which shows the functional design and the operation of the smart card virtual hub.

FIG. 4 is a detailed block diagram which shows the functional design and the operation of the smart card virtual hub 200 in accordance with the invention. The arrangement shown in FIG. 4 is an expansion of the system shown in FIG. 3. The functional blocks shown in FIG. 3 are explained herein with regard to details of how they work, the technique required to make them work, and the sub-blocks and components required to meet the design objectives.

The USB hub 300 comprises a hub controller 410, a repeater 415, a power controller 418, a smart card port controller 420, and a USB device port controller 425.

The hub controller 410 connects to the USB transceiver 402, where it receives the control and data transaction from the computer 110. The hub controller 410 controls and manages the operation of the repeater 415, power controller 418, and port controllers 420 and 425 in accordance with control information received from the computer 110.

The hub controller 410 also maintains configuration information and parameters of the hub 300, and descriptors which specify the power consumption requirement, power management, data transfer protocol, and data packet size. The descriptors are used to setup the function, the interface, and the communication protocol between the computer 110, hub controller 410, repeater 415, power controller 418, and port controllers 420 and 425. When the USB transceiver 402 is first connected to the USB connector 293 of the computer 110 via the USB cable, the computer 110 reads and obtains those parameters from the hub controller 410. The computer 110 then issues the appropriate commands to setup the particular function to function properly in the hub 300, which includes the hub controller 410, repeater 415, power controller 418, and port controllers 420 and 425, conforming to these configuration parameters. It also configures itself to operate with the hub 300 in cooperation with the system software and device driver. These particular functional settings, configurations, and relationship remain the same until the transceiver 402 is disconnected from the computer 110. A re-connection of the transceiver 402 to the computer 110 re-starts this configuration process. This unique configuration process is referred to as Plug N Play, and it allows the computer 110 to recognize automatically any new device attached to the USB bus, while also setting up the operating relationship with the computer.

The hub controller 410 also maintains the status changes information of the port controllers 420 and 425, power controller 418, and repeater 415, and provides this information to the computer 110 when requested. This status change information includes any or all of power change, overcurrent, port connect/disconnect, port enable/disable, and port suspend/resume change.

The hub controller 410 also decodes the control commands addressed to it from the computer 110 and provides necessary data back to the computer. When commands are addressed to the smart card reader port controller 420 or USB device port controller 425, the hub controller 410 generates necessary control signals for the respective port controller to which the computer 110 is addressed.

In the presently preferred embodiment of the invention, the hub controller supports two endpoints for data transactions, ie. one control endpoint with endpoint #0 and a second interrupt endpoint with endpoint #1. The hub controller comprises a digital phase locked loop (PLL), serial interface engine (SIE), and command interpreter. The digital PLL extracts a clock and data from the USB cable. The SIE handles synchronization pattern recognition, NRZI-NRZ conversion, bit (de)stuffing, CRC checking/generation, packet decoding/encoding, and parallel/serial conversion.

The command interpreter consists of three components: The first component decodes and handles all necessary USB standard commands address to endpoint #0; the second component decodes hub class commands and maintain the status and change information for the downstream ports and the hub; the third component contains the descriptor information for all USB standard descriptors and the hub class descriptor. The command interpreter decodes all hub class commands addressed to the hub and provides necessary data, which is packetized in the SIE and sent to the host computer. The data may include hub descriptor data, hub status, and hub status change information, for example. If hub class commands are addressed to the ports, the command interpreter decodes such commands and generates necessary control signals to the respective port block to which the host computer is addressed. The command interpreter also maintains the hub and port status change bitmap. When the host computer issues an IN request for the interrupt endpoint #1, if there is a change in the status change bitmap, the hub controller sends the status change bitmap to the host computer. Otherwise, the hub controller issues a NAK to the host that indicates there has not been a change in the status change bitmap.

A frame timer function (not shown) contains frame timer logic that is synchronized to SOF packets which are derived from the host computer's frame timer, and which generates two timing points—EOF1 and EOF2—therefrom. These timing reference points are used by the hub repeater to detect a babbling device, prevent the hub from being disabled by an upstream hub, and establish connectivity between ports.

The hub repeater 415 connects to the USB transceiver 402, hub controller 410, smart card reader port controller 420, and USB device port controller 425. When the hub controller 410 detects that the USB device controller 430 is attached to the smart card reader port controller 420, the hub controller 410 sets the status change. The computer 110 polls the status change information from the hub controller 410 and determines whether or not a device is attached. The computer 110 then issues a port enable signal to the hub controller 410 to signal the repeater 415 to enable the smart card reader port controller 420.

In the same scenario, the USB device port controller 425 is enabled when an external device 370 is connected to the USB transceiver 403. When the repeater 415 sees a data transmission that originates at the computer 110 arrive on the USB transceiver 402, the repeater 415 establishes a connection between the computer 110 and the USB device controller 430 if the smart card port controller 420 is enabled. A connection between the computer 110 and the external device 370 is also established in a similar fashion. The connection remains established until the repeater 415 detects an end of packet (EOP) transmission on the USB transceiver 402.

The repeater 415 also establishes a connection between the USB device controller 430 and the computer 110, between the external device 370 and the computer 110, when the port controllers 420 and 425 are enabled, and the repeater 415 sees that there are data transmissions which originate on the USB device controller 430 and the external device 370. The connection break downs once an EOP condition is detected on the connected port controller.

The hub repeater sets up and tears down connections between a root port and downstream ports through the port controllers. The hub repeater takes D+ and D− signals from the root port and all downstream ports, and establishes a connection between one downstream port and the root port, or from the root port to all downstream ports based upon a current state of a port logic machine. A multiplex is used to select data coming from the downstream ports for upstream connectivity.

The smart card port controller 420 interfaces with the USB device controller 430 for control and data transfer between the computer 110 and the smart card interface 450. The port controller 425 connects to the USB transceiver 403 to interface with the external USB device 370. When the port controller 425 detects that the external device 370 is connected or disconnected to the USB transceiver 403, it reports the port status and change information to the hub controller 410. The port controller 425 is then enabled, disabled, or suspended by the computer 110 through the control of the hub controller 410 and the repeater 415. The port controller 425 also detects the speed of the attached device 370 and converts the full speed signals from computer 110 to full speed or low speed signals which are routed to the external connected device 370, and vice-versa.

The port controller contains a port state machine that controls the downstream port. One port controller is provided for each downstream port. The port controller detects the connect/disconnect events on the port and can enable/disable/suspend the port. The port controller also reports the port status and change information to the hub controller, detects the speed of the attached device, and converts a full speed signal from the root port to a full/low speed signal for the downstream port, and vice versa.

A suspend/resume controller (not shown) handles all USB suspend/resume events, both as a USB device and also as a pass through in terms of propagating suspend and resume signaling to the ports. The suspend/resume controller monitors the root port D+ and D− signals for a three msec idle time to go into the suspend mode, Once the hub is in the suspend mode, it can come out of it upon either receiving the resume signal form the host computer or because a resume event has occurred on one of its downstream ports.

The power controller 418 connects to the hub controller 410 and decodes the set port power signal and clear port power signal which originates at, and is routed from, the computer 110. The power controller generates the necessary signals to allow the power switch 320 to control the voltage supply to the external device 370 connected to USB transceiver 403. The power controller 418 also monitors the over-current condition for the device 370 and updates the computer 110 via the status registers in the hub controller 410 when requested.

The USB device controller 430, USB protocol converter 440, and the smart card interface 450 are key components of the smart card reader interface 310, shown in FIG. 3. The USB device controller (UDC) 430 is connected to the port controller 420 to receive the control command and information addressed to it and to the USB protocol converter (UPC) 440 and the card interface logic (CIL) 450 from the computer 110. The UDC 430 decodes control commands from the computer 110 and responses by returning data to the computer 110, or it executes commands as requested to configure the UDC 430. The UDC 430 passes any CIL 450 related control commands to the USB protocol converter (UPC) 440 so that the UPC 440 can decode the command and execute thereupon. The UDC 430 also handles error recovery if the data transfer protocol is violated during transmitting/receiving to/from the UPC 440.

The UDC interfaces the card interface logic to the USB hub. There are three main functions of the UDC: First, maintain information relating to control endpoint, interrupt endpoint, bulk-in endpoint, and bulk-out endpoint, where endpoint information includes transfer type, direction, packet size, and address pointers. Second, decode and handle all of the control transfers addressed to endpoint #0. When the UDC receives a vendor specific or class specific command, it passes it to the UPC so that the UPC can decode the command and execute thereupon. There UDC also passes the GetDescriptor command to the UPC. Third, handle error recovery if a data transfer protocol is violated during a transaction and interface to the UPC.

The UPC 440 connects to the UDC 430 and receives the smart card interface 450 related control command and information which is addressed to the external smart card from the computer 110. The UPC 440 implements the smart card specific portion of the USB protocol, such as data transfer registers (Endpoints), and operations such as suspend, resume, RemoteWakeup. It decodes and processes USB commands to generate read/write register/buffers requests to the smart card interface 450 to setup the communication and control flow. It also packetizes the read data from the card interface logic (CIL) for the UDC 430.

In the presently preferred embodiment of the invention, there are five different modes of data transfer, i.e.:
control read register requests used to read the configuration and status from CIL registers;
control write register commands used to setup the control and configuration to CIL registers;
An interrupt is used to communicate the CIL 450 interrupt to the computer 110;
FIFO read requests used to return data from the CIL buffer memory; and
FIFO write requests used to send data to the CIL buffer memory.

These data transfers are, from the USB software point of view, vendor-specific read register requests, vendor-specific write register requests, interrupts, Bulk in, and Bulk out. A re-transmission buffer is required for data read from the CIL 450 and interrupt transfer (data read) to the CIL interrupt register. A verification buffer is required for data write to the CIL 450.

The UPC 440 also contains the descriptors of the complete smart card reader interface 310, which include the UDC 430, UPC 440 and CIL 450, and which specify the power consumption requirement, power management, data transfer protocol, and data packet size. The UPC 440 provides the descriptor information to the computer 110 through the control of the hub 300 when requested. This is done during a configuration period when the hub 300 is first connected to the USB connector 293 of the computer 110. The computer 110 evaluates the configuration information from the descriptors and verifies the availability of USB resources, and then issues a set configuration command to configure the UDC 430, specifying how the embedded function (UDC+UPC+CIL) to operate and interface with the computer 110. The computer 110 then establishes a connection with the UDC 430, UPC 440, and CIL 450 through the cooperation with the system software and the device driver.

The card interface logic (CIL) 450 is connected to the USB protocol converter 440 to receive control and data transfer initiated from the computer 110, as well as for transmitting data from the external smart card to the computer 110. The card interface logic generates interface signals to support transactions for any type of smart card that is compliant with the ISO 3716 standard. Such interface signals include Reset, Card Power Enable, and Card Clock.

When the CRDDET signal detects that a card is inserted into the card socket, a 5VEN# signal is enabled and the +5VCC is supplied to the card by the power distribution switch 320. If the smart card does not provide an answer-to-reset (ATR) signal, then the interface logic deactivates the card. After a delay of ten msec 3VEN# is enabled and +3VCC is then supplied to the card. If the smart card provides an ATR, the card interface continues to apply or maintain the same operating voltage to the smart card. The CRDLED# is then enabled and the smart card LED is illuminated. The LED is turned off when the smart card is removed.

The smart card reader interface 310 supports three types of transactions between the card interface logic and the host computer: writes to smart card reader registers, host computer reads from smart card reader registers, and a smart card reader interrupt to the host computer. When an interrupt is sent to the host computer, the host is required to acknowledge the interrupt.

The CIL 450 generates the clock for the external card and sets up the communication speed of data transmission to the card. A timer is used to check for timeouts to determine the status of data transmission and card activities. It also contains configuration registers that are used by the computer 110 for setting up the operation mode, communication protocol, and transmission flow of the CIL 450, with the control of UPC 440.

When an external card is inserted into the card socket, a card detect signal is asserted and detected by the CIL 450. The CIL 450 enables the power control to the power switch 320 to provide a voltage supply to the card.

The power switch 320 regulates the five-volt supply provided by the computer 110 via the USB cable, and distributes it to the external smart card and the external device 370 connected to the transceiver 403.

For the smart card, the power switch 320 supplies either a +3V VCC or +5V VCC voltage supply to the card, depending on whether the 3VEN# signal or the 5VEN# signal is asserted from the CIL 450. When both signals are inactive, it indicates that the card is removed, and the power switch 320 and VCC voltage supply are cutoff.

For the USB device 370 connected to downstream port at transceiver 403, the power switch 320 provides +5V USB VCC to the device 370 when the port-power signal from power controller 418 is asserted.

The power switch 320 also features an over-current protection mechanism. When a current-limit threshold is exceeded due to excess current demand from device 370 or external card, the power switch 320 signals a fault flag to the power controller 418 and report the status to the computer 110.

The clock switch 406 controls the clock distribution to the UDC 430, UPC 440, and CIL 450. The computer 110 only has 100 mA available for the hub 300, which includes the hub controller 410, power controller 418, repeater 415, and port controllers 420 and 425, before it gets configured when it first connects to the computer through the transceiver 402. The UDC, UPC, and any component in the smart card virtual hub 200 that draw power during this time draw power from that 100 mA allowance. When this embedded function (UDC+UPC+CIL) is active, it could bring the total power consumption to more than 100 mA, and the hub 300 may fail to get configured. The clock switch 406 provides a clock-stopping mechanism to control the embedded function power consumption before the hub 300 gets configured. After the hub 300 is configured, the clock switch 320 distributes a 48 MHz clock to the UDC, and a 24 MHz clock to the CIL when the port enable signal from the smart card port controller 420 is asserted. A 12 MHz clock output from the UDC is then provided to the UPC. The 48 MHz and 24 MHz clocks originate at the PLL 470. Once the hub 300 is configured, additional current, as described in the hub configuration descriptor, is available for the embedded function (UDC+UPC+CIL) and its inserted smart card to draw from the computer 110.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. An apparatus for connecting at least one USB device to a single point of connection for a USB bus, comprising:

a virtual hub for interfacing said USB device to a host computer, said hub comprising a USB smart card reader interface, a USB hub, power switch circuitry, and at least one port to which a USB device may be attached, wherein said USB device and said smart card reader interface share a common USB bus bandwidth via said USB hub through a host-scheduled, token-based communication protocol that is handled by a USB driver and a corresponding respective device driver;

a smart card reader coupled to said smart card reader interface;

an enclosure which contains said virtual hub, said smart card reader, and at least one port connection for at least one USB device other than said smart card reader; and a clock switch comprising a clock-stopping mechanism for controlling embedded functions power consumption before said virtual hub is configured, and for distributing a clock signal to said embedded functions after said virtual hub is configured to enable said embedded functions;

wherein said smart card reader interface generates interface signals to support the operation of at least one smart card that is compliant with the ISO 7816 standard; and wherein said power switch circuitry is controlled by said USB hub and said USB smart card reader interface and is capable of supplying power to said smart card.

2. The apparatus of claim 1, wherein said at least one port connection for said at least one USB device is internal to said enclosure, and wherein said USB device is a USB keyboard controller and an associated keyboard.

3. The apparatus of claim 1, wherein said smart card reader is permanently coupled to the said smart card reader interface of the said virtual hub within said enclosure; and wherein at least one downstream port of said virtual hub is used as an attachment point to connect external USB devices to said host computer via an upstream data port.

4. The apparatus of claim 1, wherein said virtual hub further comprises:
a hub controller;
a repeater;
a power controller;
a smart card port controller; and
a USB device port controller.

5. The apparatus of claim 4, wherein said hub controller connects to a USB transceiver, where it receives control and data transactions from said host computer; wherein said hub controller controls and manages operation of said repeater, said power controller, and said port controllers in accordance with control information received from said host computer.

6. The apparatus of claim 4, wherein said hub controller maintains configuration information and parameters of said virtual hub, and descriptors which specify power consumption requirement, power management, data transfer protocol, and data packet size; wherein said descriptors are used to setup a function, an interface, and a communication protocol between said host computer, said hub controller, said repeater, said power controller, said smart card reader interface, and said port controller.

7. The apparatus of claim 1, wherein said virtual hub allows said host computer to recognize automatically any new USB device attached to said host computer via the ports of said virtual hub, while also setting up an operating relationship with said host computer.

8. The apparatus of claim 1, wherein said virtual hub allows any new USB device to be attached to said host computer via the ports of said virtual hub and be recognized by said host computer without the need to power said host computer on or off.

9. The apparatus of claim 1, wherein said virtual hub allows at least one USB device to be attached to said host computer via said virtual hub via a single cable having a single connector.

10. The apparatus of claim 4, wherein each said port controller comprises a pod state machine that controls a downstream port; wherein one port controller is provided for each downstream port; wherein each said port controller detects connect/disconnect events on an associated port and can enable/disable/suspend said associated port; wherein each said port controller reports port status and change information to said hub controller, detects the speed of an associated USB device, and converts a full speed signal from a root port to a full/low speed signal for a downstream port, and vice versa.

11. A method for connecting at least one USB device to a single point of connection for a USB bus, comprising the steps of:
providing a virtual hub for interfacing said USB device to a host computer, said hub comprising a USB smart card reader interface, a USB hub, power switch circuitry, and at least one port to which said USB device may be attached, wherein said smart card reader interface and said USB device share a common USB bus bandwidth via said USB hub through a host-scheduled, token-based communication protocol that is handled by a USB driver and a corresponding respective device driver;
providing a smart card reader coupled to said smart card reader interface;
providing an enclosure which contains said virtual hub, said smart card reader, and at least one port connection for at least one USB device other than said smart card reader; and
providing a clock switch comprising a clock-stopping mechanism for controlling embedded functions power consumption before said virtual hub is configured, and for distributing a clock signal to said embedded functions after said virtual hub is configured to enable said embedded functions;
wherein said smart card reader interface generates interface signals to support the operation of at least one smart card that is compliant with the ISO 7816 standard; and
wherein said power switch circuitry is controlled by said USB hub and said USB smart card reader interface and is capable of supplying power to said smart card.

12. The method of claim 11, wherein said at least one port connection for said at least one USB device is internal to said enclosure, and wherein said USB device is a USB keyboard controller and an associated keyboard.

13. The method of claim 11, wherein said smart card reader interface is permanently connected to a internal downstream port of the said virtual hub within said enclosure; and wherein at least one other downstream port of said virtual hub is used as an attachment point to connect external USB devices to said host computer via an upstream data port.

14. The method of claim 11, wherein said virtual hub allows said host computer to recognize automatically any new USB device attached to said host computer via the ports of the said virtual hub, while also setting up an operating relationship with said host computer.

15. The method of claim 11, wherein said virtual hub allows any new USB device to be attached to said host computer via the ports of the said virtual hub and be recognized by said host computer without the need to power said host computer on or off.

16. The method of claim 11, wherein said virtual hub allows at least one USB device to be attached to said host computer via said virtual hub via a single, cable having a single connector.

* * * * *